Sept. 22, 1959  L. TONKS  2,905,611
FUEL ELEMENT FOR A NEUTRONIC REACTOR
Filed April 24, 1953  2 Sheets-Sheet 2
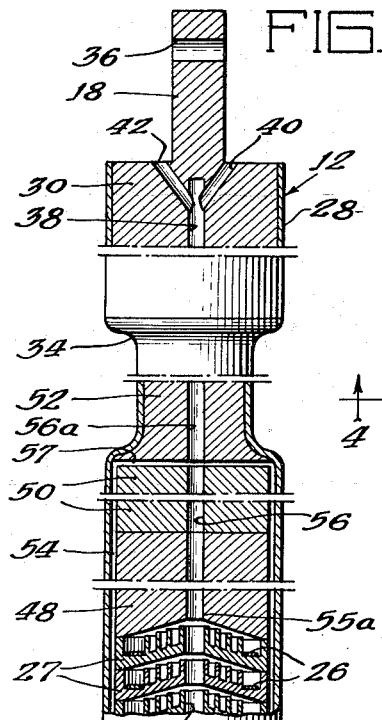
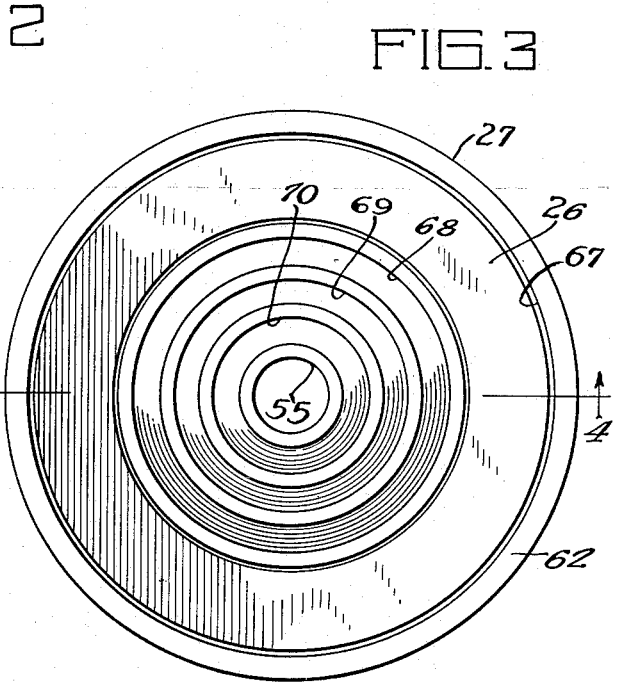
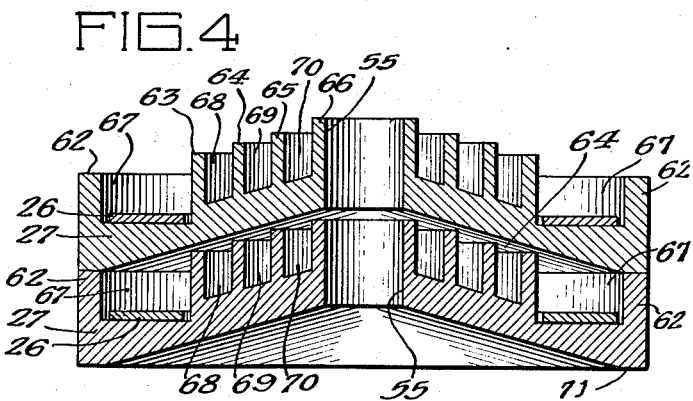
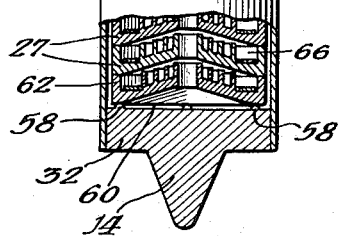
INVENTOR.
Lewi Tonks
BY
Roland A. Anderson
Attorney

United States Patent Office 2,905,611
Patented Sept. 22, 1959

2,905,611

FUEL ELEMENT FOR A NEUTRONIC REACTOR

Lewi Tonks, Scotia, N.Y., assignor to the United States of America as represented by the United States Atomic Energy Commission Application April 24, 1953, Serial No. 350,915

7 Claims. (Cl. 204—193.2)

This invention relates generally to fuel elements for a neutronic reactor. In particular it pertains to improvements in cooling and in retention of fissionable material within the active portion of the element.

Since this invention is concerned with the structure of a fuel element itself and not with the operation of the particular reactor in which it functions, a detailed discussion of a reactor employing the present fuel element will not be made herein, but for this information reference is made to the copending application Serial No. 408,628, filed February 5, 1954, now Patent 2,879,216, dated March 24, 1959. A similar fuel element and reactors, also suitable for the fuel elements of this invention, are disclosed in the copending application of Henry Hurwitz, Harvey Brooks, Clifford Mannal, John H. Payne, and Emmeth A. Luebke, Serial No. 236,644, filed July 13, 1951, now U. S. Patent 2,799,642, dated July 16, 1957. In addition neutronic reactors are also disclosed in the copending applications of Enrico Fermi and Leo Szilard, Serial No. 568,904, filed December 19, 1944, now U.S. Patent 2,708,656, dated May 17, 1955, and of Walter H. Zinn, Serial No. 721,108, filed January 8, 1947.

One result of the process of fission is the disintegration of the fiissionable material into minute particles. These particles remain fissionable after disintegration, and so they must be retained at their predesignated location. To permit the particles to migrate to various parts of the reactor would obviously reduce the efficiency as well as create a personnel hazard.

An object of this invention therefore is to prevent the migration of fissionable material to remote sections of the reactor thereby maintaining substantially constant nuclear reactivity.

Another object is to permit the escape of fission-product gases from the immediate vicinity of the active material in the fuel element.

Other objects of this invention will in part be obvious and appear hereinafter.

For a more complete understanding of the nature and scope of this invention, reference can be had to the following detailed description taken together with the accompanying drawings in which:

Fig. 2 is an elevation view, partly in section, of one embodiment of a fuel element of the present invention;

Fig. 3 is an enlarged plan view of a portion of the fuel element shown in Fig. 4;

Fig. 4 is an enlarged vertical sectional view of a portion of the fuel element, taken on the line 4—4 of Fig. 3 and showing the manner in which the fissionable material is disposed within each fuel element; and Fig. 5 is an enlarged vertical sectional view of a fissionable wafer.

Figure 1:
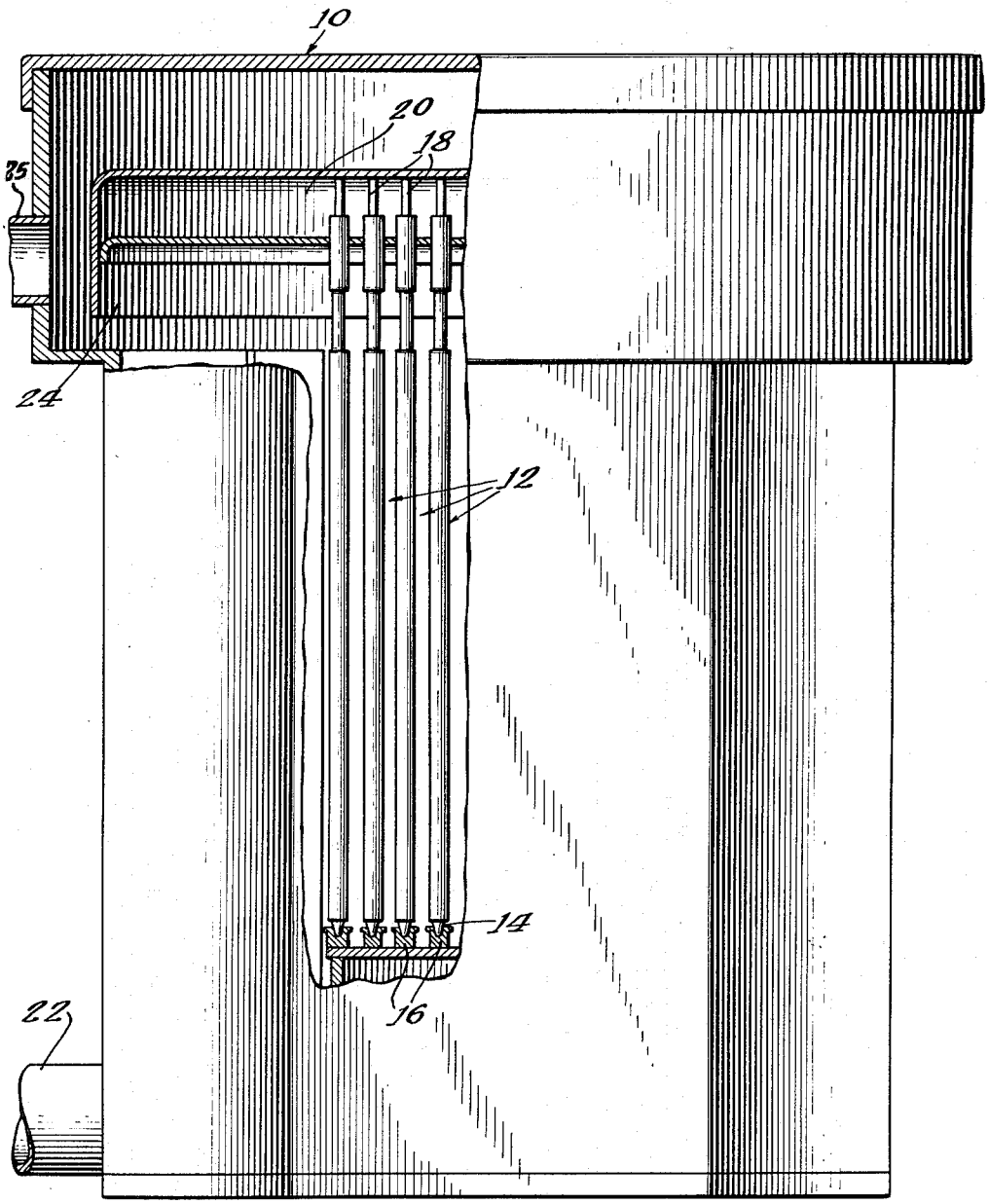
Fig. 1 is an elevation view, partly in section, of a neutronic reactor.

The proposed fuel element is elongated and is sustained generally vertical to promote the rise of fission-product gases. The transverse cross section of the element illustrated in the present application is circular because of ease of fabrication, but such section may have some other curved outline or a polygonal outline.

A neutronic reactor is generally indicated at 10 in Fig. 1. Within the reactor 10 a plurality of fuel elements 12 are vertically disposed in spaced relationship with respect to each other for the passage of a liquid coolant (not shown). The lower end of each element 12 has a wedge portion 14 projecting centrally from the under surface and along the vertical axis thereof. This portion is provided for insertion into a complementary V-shaped bracket 16 in order to retain the lower end of the element 12 is a fixed position within the reactor 10. The upper end of the element 12 includes a hanger 18 by which the element is lowered into position by a crane (not shown) and by which the upper end of the element 12 is sustained in position within the reactor 10. In addition, the upper end of the fuel element 12 extends into a gas collection chamber 20 where fission-product gases, such as xenon and krypton, detrimental to the operation of the reactor, are collected during the operation thereof. The manner in which these gases are directed to the chamber 20 will be disclosed hereinafter. Further a liquid coolant in which the elements 12 are immersed enters the reactor 10 at an inlet 22 and rises upwardly to a plenum chamber 24 from which it exits through an outlet 25.

One of the fuel elements 12 is indicated in Fig. 2. Essentially, this element consists of a stack of alternate fissionable wafers 26 and separating bodies 27, preferably of neutron-moderating material, and a sodium-filled tube 28 jacketing the stack. This tube is formed of non-fissionable material, that is, a material not fissionable by thermal neutrons, preferably stainless steel. Inasmuch as the major portion of the element 12 is immersed in a liquid coolant, the extremities of the jacket 28 are closed by a cap 30 and a base 32 in liquid-tight joints. The wedge portion 14 at the lower end of the element 12 is integral with the base 32. Near the top of the element 12 the jacket 28 contains a necked portion 34 which, as shown in Fig. 1, together with similar portions of adjacent elements 12 facilitates the movement of the liquid coolant within the plenum chamber 24 toward the outlet 25.

Extending upwardly from the top of the cap 30 is the hanger 18 containing a hole 36 by which the element 12 is handled while being placed in and removed from the reactor. Within the cap 30 is an axial bore 38. This bore and other central apertures in members to be described presently combine to form a long axial passage extending throughout the length of the element 12 from the base 32 to a point within the cap 30 from which communication with the upper surface of said cap is established by means of branches 40 and 42. It is through the long axial passage that the fission gases escape from the active portion of the fuel element 12 into the gas collection chamber 20 as alluded to above.

Between the cap 30 and the base 32 are disposed the moderating bodies 27 and the fissionable wafers 26, which comprise the active portion of the element 12. The wafers and bodies are stacked upon the base 32 over a greater portion of the element 12. The particular configuration of the bodies 27 will be described in detail hereinafter. Each body 27 supports a wafer 26 which is preferably of $U^{235}$-enriched uranium or the like. The stack of moderating bodies 27 supports a neutron-reflecting block 48 of moderating material. The bodies 27 and the block 48 are preferably composed of beryllium. In turn, above the block 48 is disposed a mass 50 of breeding material, such as thorium, or other material such as graphite for reflecting neutrons, or a material such as cobalt for forming other isotopes by neutron absorption. Above this is a member 52 of non-fissionable material, such as iron or nickel, mounted within the necked portion 34 adjacent the under surface of the cap 30 so as to have tight engagement with the interior of the necked portion.

The moderating bodies 27, the moderating block 48, and the breeding mass 50 externally conform to the interior of the jacket 28, but have outside diameters somewhat smaller than the inside diameter of the jacket 28, whereby an annular space 54 is formed. The bodies 27, the block 48, the mass 50, and the member 52 have central passages 55, 55a, 56, and 56a, respectively, which are aligned with the bore 38 in the cap 30 and in effect constitute an extension thereof. Atop the breeding mass 50 is a flat chamber 57 disposed between said mass and the member 52. This chamber connects the bore 38 with the annular space 54.

At the lower end of the fuel element 12, the lowermost moderating body 27 is supported upon the base 32 by means of a plurality of spaced lugs 58 arranged in a ring adjacent the periphery of said base to provide passages 60. In this manner the lower end of the annular space 54 communicates with the space below the lowermost body 27 and the passage 55 therein.

The configuration of the moderating bodies 27 is shown in detail in Figs. 3 and 4. The lower side of each body 27 is concave and generally conical. The upper side thereof is provided with a plurality of upstanding annular projections or walls 62, 63, 64, 65, and 66, which define an annular groove 67 and annular channels 68, 69, and 70. The groove 67 formed between the walls 62 and 63 is relatively wide and has a flat bottom upon which the fissionable wafer 26 in the form of a ring rests. The channels 68, 69, and 70 are narrower than the groove 67 and have bases that may be inclined upwardly and inwardly so as to lie generally on the same imaginary conical surface. The free ends of the walls 63, 64, 65, and 66 lie generally on the same upwardly and inwardly inclined imaginary conical surface and are arranged with respect to the outer wall 62 so that when the outer wall 62 of a given body 27 engages the base of the body 27 above, the ends of the walls 63, 64, 65, and 66 are somewhat spaced from the bottom conical surface of the body 27 above in generally equal amounts. The outermost wall 62 of a given body 27 and a rim portion 71 on the lower side of the body 27 above adjacent the periphery are seated against one another so that the bodies are closed to the passage of fluid between the space 54 and the space between the bodies.

Operation

In operation it is contemplated that the fuel elements 12 are immersed in a suitable external liquid coolant, such as liquid sodium or an alloy of sodium and potassium in liquid state. This coolant is moved through the reactor 10 by means of a pump (not shown). The fissionable wafers 26 and moderating bodies 27 of each fuel element 12 are immersed in a thermally conductive internal liquid entirely contained within the associated jacket 28. This internal liquid is to effect a satisfactory heat transfer between the parts and may be of sodium. The level of the internal liquid is kept in the passage 56a in the member 52 so that the internal liquid will not escape from the fuel element through the passages 40 and 42 because of expansion of the internal liquid due to heating or turbulence due to the evolution of gases. By virtue of the heat of fission, this liquid is circulated by convection upwardly through the central passages 55, 55a, and 56 in the bodies 27, the block 48, and the mass 50, radially outward through the space 57, downward through the annular space 54 and along the jacket 28, and radially inward through the passages 60 and along the bottom of the lowermost body 27. The liquid yields its heat to the jacket 28 which in turn is cooled externally by the liquid coolant in which the element 12 is immersed. The liquid enters the space between the bodies 27 and the annular channels 67, 68, 69, and 70 as shown in Fig. 4, since the ends of the annular walls 63, 64, 65, and 66 of a given body 27 are spaced from the bottom conical surface of the body 27 thereabove. In this manner, the fissionable wafers 26, which constitute the active portion of the fuel element, are completely immersed in the internal liquid coolant. During the operation of the reactor the uranium wafers 26 evolve fission gases, such as xenon and krypton. Bubbles of these gases rise in the internal liquid to the bottom conical surfaces of the bodies 27 and move upward therealong to the central passages 55. They rise through the internal liquid in central passages 55, 55a, 56, and 56a and escape from the internal liquid to the gas-collecting chamber 20 through the bore 38 and passages 40 and 42 in the cap 30.

With prolonged operation the wafers 26 of fissionable material begin to disintegrate into minute particles of fissionable material. Because of the vigorous action of the internal coolant within the groove 67 caused by the fissioning of the wafers 26, the particles of fissionable material tend to be carried by the liquid out of the grooves in a manner similar to the movement of the fission-product gases, that is, to migrate away from the wafers 26. Since the spaces between the walls 63, 64, 65, and 66, and the bottom conical surface of the body 27 above are small, and the channels 68, 69, and 70 are formed by the walls, this migration is inhibited, and the particles of fissionable material tend to be retained in the groove 67 where the fissionable wafer is located or in the channels 68, 69, and 70. The minute particles of fissionable material have difficulty in hurdling the walls 62, 63, 64, and 65 and remain in the groove 67 and the channels 68, 69, and 70 for the most part. Thus the particles are kept relatively near the fissionable wafers 26, and there is little or no interference with efficiency and output of the reactor, such as might result from movement of the particles out into the central passages 55 of the bodies 27 and settling thereof on the base 32. Moreover, if the particles do not get into the path of the internal liquid flowing upward through the passages 55, they cannot escape from the fuel element 12 through the bore 38 and the passages 40 and 42.

Inasmuch as certain changes can be made in the foregoing embodiment of the present invention, it is intended that all matter shown in the accompanying drawings and description shall be interpreted as illustrative only and may be modified without departing from the intended scope of the invention.

What is claimed is:

1. A fuel element for a neutronic reactor comprising a plurality of stacked bodies of nonfissionable material, each body having a continuous groove on the upper surface near the periphery, each body also having a central aperture disposed longitudinally of the element, each body also having at least two continuous channels concentrically disposed between the aperture and the groove, a wafer containing thermal-neutron-fissionable material in the groove, a thermally conductive jacket surrounding the bodies, and a thermally conductive liquid within the jacket and immersing the bodies.

2. A fuel element for a neutronic reactor comprising a plurality of stacked bodies of nonfissionable material, each body having a continuous groove on the upper surface near the periphery, each body also having a central aperture disposed longitudinally of the element, each body also having at least two continuous channels concentrically disposed between the aperture and the groove, the inner channel being higher than the outer channel, a wafer containing thermal-neutron-fissionable material in the groove, a thermally conductive jacket surrounding the bodies and a thermally conductive liquid within the jacket and immersing the bodies.

3. A fuel element for a neutronic reactor comprising a vertical tubular jacket of nonfissionable material, a plurality of neutron-moderator bodies stacked within the jacket, having central apertures generally aligned with one another, each body having on its top side a groove and a plurality of channels extending around the aperture, the channels lying between the aperture and the groove, the free ends of the walls defining the channels being located generally on an incline extending upwardly from the groove toward the aperture, the bottom surface of each moderator body being inclined upwardly from the periphery toward the aperture so as generally to follow the incline of the aforementioned walls of the moderator body below while leaving small spaces between itself and the ends of the aforementioned walls, a wafer containing thermal-neutron-fissionable material disposed in each groove, and a thermally conductive liquid in the jacket and immersing the moderator bodies and wafers, whereby gases generated by fission escape from the groove in a given moderator body through the small spaces between the aforementioned walls thereof and the bottom surface of the moderator body above to the aperture thereof.

4. A fuel element for a neutronic reactor comprising a vertical jacket of nonfissionable material, a plurality of neutron-moderator bodies stacked within the jacket and having central apertures generally aligned, each moderator body having a groove about the aperture in the top surface and at least two continuous channels concentrically disposed between the aperture and the groove, there being only small spaces between the bottom side of the moderator body above and the free ends of the walls defining said channels, a wafer of thermal-neutron-fissionable material in each groove, and a thermally conductive liquid in the jacket and immersing the moderator bodies and the wafers, whereby gases generated by fission escape from the groove of a given body through the small spaces between the aforementioned walls thereof and the bottom side of the body above to the aperture thereof.

5. A fuel element for a neutronic reactor comprising a vertical jacket of stainless steel, a plurality of annular beryllium members stacked within the jacket so as to form an axial bore, each member having an annular groove about the bore, a plurality of annular uranium-containing bodies in the grooves, and liquid sodium in the jacket and immersing the members and bodies, each member also having a bottom surface inclined upwardly from the periphery to the bore, the top side of each member having at least two continuous channels concentrically disposed between the aperture and the groove, the bottom surface of one member being close to but spaced from the top side of the member below it to provide narrow passages, whereby gas generated by fission of a body in a groove of one member escapes through the narrow passages between the top of said one member and the bottom of the member to the axial bore and the fission fragments are caused by the narrow passages to stay in the groove or the channels.

6. A fuel element for a neutronic reactor comprising a vertical jacket of nonfissionable material, a plurality of neutron moderator bodies having apertures and being stacked within the jacket to cause the apertures to form a substantially axial bore, each moderator body having rims on the top and bottom adjacent the periphery, the rim on the top of one body engaging the rim on the bottom of the body above to close the space between the bodies to the region outside of the bodies, the top of each body being inclined upwardly from the rim to the aperture and having an annular groove adjacent the periphery and at least two annular channels disposed between the aperture and the groove, a wafer of thermal-neutron-fissionable material in the groove of each moderator body, and liquid sodium in the jacket and immersing the bodies, the bottom surface of one moderator body being closely spaced from the portions of the body below defining the channels so as to provide passages, whereby gases generated by fission of wafers escape through said passages to the axial bore and the fission fragments are confined by the narrow passages to the grooves and the channels.

7. A fuel element for a neutronic reactor comprising a vertical jacket of nonfissionable material, a plurality of annular beryllium members stacked within the jacket forming an axial bore, the portion of each member between the periphery and the bore being spaced from the adjacent members and being conical and inclined upward toward the bore, a wafer of neutron-fissionable material disposed on the top side of each member, the top side having at least two endless channels concentrically disposed between the wafer and the bore, an annular reflector body of neutron-moderator material above the stacked members, and a thermally conductive liquid in the jacket and immersing the beryllium members and the wafers.

References Cited in the file of this patent
UNITED STATES PATENTS
2,798,848     Kingdon _____ July 9, 1957